US008855977B2

(12) United States Patent
Hallquist (10) Patent No.: US 8,855,977 B2
(45) Date of Patent: Oct. 7, 2014

(54) NUMERICALLY SIMULATING STRUCTURAL BEHAVIORS OF A PRODUCT USING EXPLICIT FINITE ELEMENT ANALYSIS WITH A COMBINED TECHNIQUE OF MASS SCALING AND SUBCYCLING

(75) Inventor: John O. Hallquist, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 415 days.

(21) Appl. No.: 13/351,945

(22) Filed: Jan. 17, 2012

(65) Prior Publication Data

US 2013/0185030 A1    Jul. 18, 2013

(51) Int. Cl.
*G06F 7/60* (2006.01)
*G06F 17/10* (2006.01)
*G06F 17/50* (2006.01)

(52) U.S. Cl.
CPC ............... *G06F 17/5018* (2013.01); *G06F 2217/16* (2013.01)
USPC .................................................. 703/2; 703/6

(58) Field of Classification Search
CPC . G06F 17/50; G06F 17/5009; G06F 17/5018; G06F 2217/16
USPC ..................................................... 703/2, 8, 6
See application file for complete search history.

(56) References Cited

U.S. PATENT DOCUMENTS

| | | | |
|---|---|---|---|
| 7,953,578 B2 * | 5/2011 | Roger et al. ................ | 703/1 |
| 8,401,827 B2 * | 3/2013 | Patnala ....................... | 703/2 |
| 8,473,266 B2 * | 6/2013 | Guist ......................... | 703/7 |
| 8,494,819 B2 * | 7/2013 | Hallquist ................... | 703/2 |
| 2007/0244676 A1 * | 10/2007 | Shang et al. ............... | 703/2 |
| 2009/0228246 A1 * | 9/2009 | Lacome ..................... | 703/2 |
| 2009/0299702 A1 * | 12/2009 | Grimes et al. ............. | 703/1 |
| 2009/0326883 A1 * | 12/2009 | Mizutani et al. .......... | 703/2 |
| 2010/0076739 A1 * | 3/2010 | Hallquist ................... | 703/8 |
| 2010/0131256 A1 * | 5/2010 | Hallquist ................... | 703/8 |
| 2010/0256957 A1 * | 10/2010 | Slavik ........................ | 703/2 |
| 2011/0077912 A1 * | 3/2011 | Chen et al. ................. | 703/1 |
| 2014/0049534 A1 * | 2/2014 | Ho ............................ | 345/419 |

OTHER PUBLICATIONS

Nielsen "Sheet Metal Forming simulation using Explicit Finite Element Methods". Third Edition 2000., ISBN87-89767-69-6. 402 Pages.*
Sorg "Crashworthiness Assessment of Automobile Front Ends using Explicit Finite Element Formulations". May 2008. University of Stuttgart. 156 Pages.*
Lin et al. "DYUN3D Code Practices and Development". U.S. Department of Energy. Apr. 21, 2000., 17 Pages.*

* cited by examiner

*Primary Examiner* — Eunhee Kim
(74) *Attorney, Agent, or Firm* — Roger H. Chu (57) ABSTRACT

Methods and systems for numerically simulating structural behaviors of a product using explicit FEA with a combined technique of subcycling and mass scaling are disclosed. A FEA model representing a product and a minimum time step size ($\Delta t_{min}$) for a time-marching simulation of the product are specified. N element groups is established with the first element group associated with $\Delta t_{min}$ as required minimum time step size, while other element groups with integer multiples of $\Delta t_{min}$ according to formula $\Delta t_i = 2^{i-1} \Delta t_{min}$, n=1, 2, . . . , N. Finite elements are periodically resorted into N element groups based on their new respective $\Delta t_{cr}$. To ensure all finite elements in the FEA model are processed at the user specified minimum time step size, proper amount of mass scaling is applied to those finite elements that are or have become too small to maintain a stable solution in the first element group.

20 Claims, 8 Drawing Sheets

NUMERICALLY SIMULATING STRUCTURAL BEHAVIORS OF A PRODUCT USING EXPLICIT FINITE ELEMENT ANALYSIS WITH A COMBINED TECHNIQUE OF MASS SCALING AND SUBCYCLING

CROSS-REFERENCE TO RELATED APPLICATIONS

This application is related to a co-pending U.S. patent application Ser. No. 13/351,864 for "Numerically simulating structural behaviors of a product using explicit finite element analysis with a mass scaling enhanced subcycling technique" filed on Jan. 17, 2012. The entire content of which is incorporated herein by reference.

FIELD

The present invention generally relates to computer-aided engineering analysis, more particularly to methods and systems for numerically simulating structural behaviors of a product (e.g., automobile, airplane, etc.) using explicit finite element analysis (FEA) in conjunction with a combined technique of subcycling and mass scaling.

BACKGROUND

Finite element analysis (FEA) is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate the elements with the material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

FEA has two solution techniques: the implicit finite element analysis ("the implicit method") and the explicit finite element analysis ("the explicit method"). Both methods are used to solve transient dynamic equations of motion and thus obtain an equilibrium solution to the equations. The methods march from time (t) through a discrete time interval or time interval $\Delta t$, to time $(t+\Delta t)$. Such methods are sometimes referred to as time-marching simulation, which contains a number of consecutive time steps or solution cycles.

The present invention relates to the explicit method, which is stable only if time step size is very small—specifically, the time interval must be smaller than the time taken for an elastic wave to propagate from one side of an element to the other. The maximum time step for maintaining a stable solution in the explicit method is referred to as the critical time step size $\Delta t_{cr}$. The speed of the elastic wave is a function of material mass and stiffness of the structure represented by the finite element and the element size or dimension. For a FEA model having substantially similar material, the smallest element generally controls the critical time step size.

Even one substantially smaller element in a FEA model can cause a critical time step size unnecessarily small for majority of the elements in the FEA model. Often, a specific portion of a structure is modeled with much finer mesh in order to catch more detailed structural responses. For example, a steering wheel may be modeled with very small solid elements in comparison with the shell elements for modeling the car body. The ratio between two sizes could be 100 or more thereby causing the entire structure (i.e., car) to be analyzed with a time step size 100 or more times smaller. In another instance, the problem could also happen when any element deforms to become too small in the middle of a time-marching simulation. This is a common occurrence if foam materials are present since they may compress significantly both increasing the elastic wave speed while decreasing the shortest dimension. As a result, a very small time step would be required for the remaining of the simulation. Not only would the simulation become very real time consuming, but also impractical.

There exists a number of prior art approaches to this problem. However, none provide a satisfactory solution. One of them is referred to as subcycling, which permits different time step sizes to be used in different parts of the finite element model. However, subcycling requires periodically sorting/resorting of elements into different bins that are dynamically changed with different time step sizes. Another approach is referred to as mass scaling, which increases the critical time step size of an element by artificially increasing its mass density. However, arbitrarily applying mass scaling to the entire FEA model can change the dynamic behaviors of the structure (i.e., artificially higher mass) in an unwanted manner.

It would therefore be desirable to have methods and systems for numerically simulating structural behaviors of a product using an explicit FEA with a combined technique of subcycling and mass scaling, such that the simulation is performed efficiently and effectively.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses a system, method and software product for numerically simulating structural behaviors of a product using an explicit FEA with a combined technique of subcycling and mass scaling. According to an exemplary embodiment of the present invention, a finite element analysis (FEA) model representing a product (e.g., an automobile) is defined and received in a computer system having a finite element analysis application module installed thereon. The FEA model comprises a plurality of nodes and finite elements (e.g., shell, solid, foam elements, etc.). In addition, a minimum time step size ($\Delta t_{min}$) for a time-marching simulation of the product is also specified (e.g., by the user, (i.e., engineer, scientist who designs or helps designing the product)).

A critical time step size of each finite element in the FEA model is calculated based on its properties (i.e., stiffness, mass and size). Then the critical time step size ($\Delta t_{cr}$) of each finite element is updated by a smaller critical time step size of its neighboring or adjacent finite elements. Critical time step size based on element's properties is calculated using Eq. 4 listed in the "DETAILED DESCRIPTION" section below.

The finite elements of the FEA model are sorted into a plurality of element groups based on respective required minimum time step sizes. The plurality of element groups is established with the first element group associated with $\Delta t_{min}$ as required minimum time step size, while other element groups are associated with integer multiples of $\Delta t_{min}$. Specifically, the formula $(2^{n-1}\Delta t_{min}, n=1, 2, \ldots, N)$ is used for respective element groups and N is a whole number greater than one.

When such FEM model used in a time-marching simulation using explicit FEA, finite elements of each element group are processed or solved according to required minimum time step size of that group. That means, finite elements in the last element group are only processed at major solution cycles which correspond to the required time step size of the last element group $(2^{N-1}\Delta t_{min})$, while other elements are processed in corresponding sub solution cycles (i.e., $\Delta t_{min}$, $2\Delta t_{min}$, $4\Delta t_{min}$, etc.).

To ensure all finite elements in the FEA model in the first element group is processed at the required minimum time step size $(\Delta t_{min})$, mass scaling is applied to those finite elements that are or have become too small to maintain a stable solution in the first element group.

Furthermore, some of the finite elements can be designated to be exempted from periodic resorting, for example, finite elements representing a metallic part of an automobile (e.g., car body). To ensure a stable solution can be maintained for these elements in the originally assigned groups, mass scaling can be applied whenever required during the time-marching simulation.

At the end of each major solution cycle, the finite elements are resorted based on their respective new critical time step sizes to ensure stable solution is obtained in the next series of sub solution cycles.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-7. However, those skilled in the art will readily appreciate that the detailed description given herein with respect to these figures is for explanatory purposes as the invention extends beyond these limited embodiments.

Figure 1:
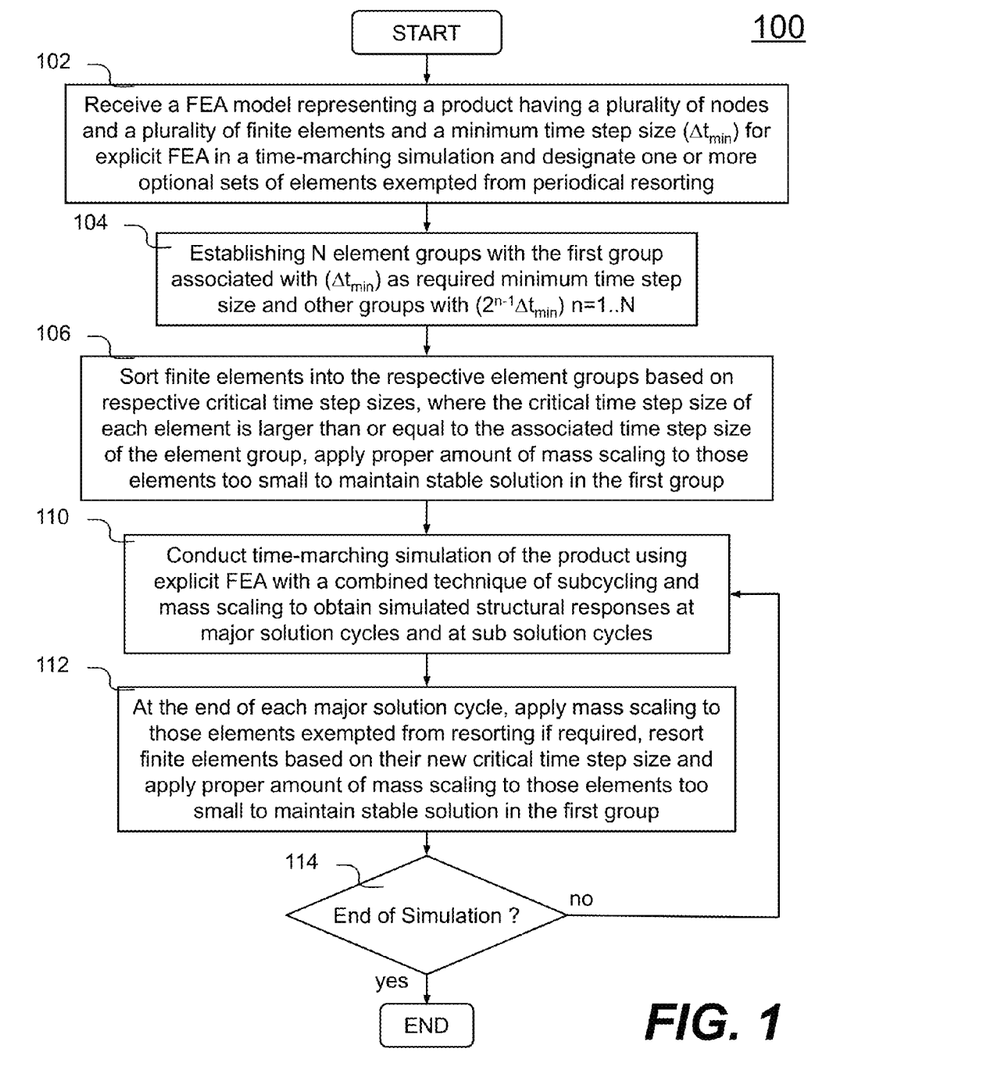
FIG. 1 is a flowchart illustrating an exemplary process of numerically simulating structural behaviors of a product using explicit finite element analysis (FEA) in conjunction with a combined technique of subcycling and mass scaling, according to an embodiment of the present invention.

FIG. 1 is a flowchart illustrating an exemplary process 100 of numerically simulating structural behaviors of a product using explicit finite element analysis (FEA) with a combined technique of subcycling and mass scaling, according to an embodiment of the present invention. Process 100 is preferably understood in conjunction with other figures and is implemented in software.

Figure 4:
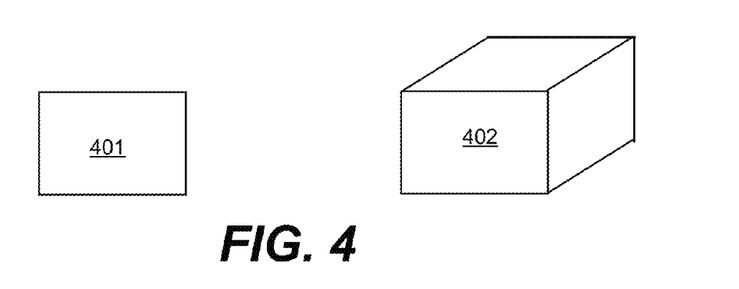
FIG. 4 is a diagram showing two exemplary finite elements that can be used in FEA model representing a product (e.g., a car) in accordance with one embodiment of the present invention.

Process 100 starts by receiving a finite element analysis (FEA) model, which represents a product or structure (e.g., an automobile, an airplane, etc.) at step 102. The FEA model includes a plurality of nodes and a plurality of finite elements with associated material properties that define the product. Types of finite elements may include, but are not limited to, solid, shell, beam, truss, etc. (FIG. 4 shows an exemplary shell element 401 and an exemplary solid element 402). Additionally, a minimum time step size $(\Delta t_{min})$ for a time-marching simulation of the product is also specified (e.g., by the user, (i.e., engineer, scientist who designs or helps designing the product)). Providing a minimum time step size ensures that the time-marching simulation can be conducted within a reasonable time frame for practical usage/concern, for example, engineers/scientists responsible for an automobile design are under a time constraint (e.g., overnight computer simulation). In addition, one or more optional sets of finite elements can be designated to be exempted from periodic resorting, for example, finite elements representing a metallic part of an automobile. In order to exempt these finite elements from periodic resorting, mass scaling is applied whenever necessary during the time-marching simulation.

Next, at step 104, N element groups are established. The first element group is associated with $\Delta t_{min}$ as the required minimum time step size, while other element groups are associated with integer multiples of $\Delta t_{min}$. Specifically, each element group corresponds to a required minimum time step size in accordance with formula $$\Delta t_i = 2^{i-1} \Delta t_{min}, i=1,2,\ldots,N$$

In other words, the first group is associated with ($\Delta t_{min}$), the second group associated with ($2\Delta t_{min}$), the third group associated with ($4\Delta t_{min}$), the N-th group is associated with ($2^{N-1}\Delta t_{min}$), and so forth.

At step 106, finite elements of the FEA model are sorted into the N element groups based on their respective critical time step sizes. N is a whole number or integer greater than one. The critical time step size of each finite element is larger than or equal to the required minimum time step size of that element group.

Figure 2A:
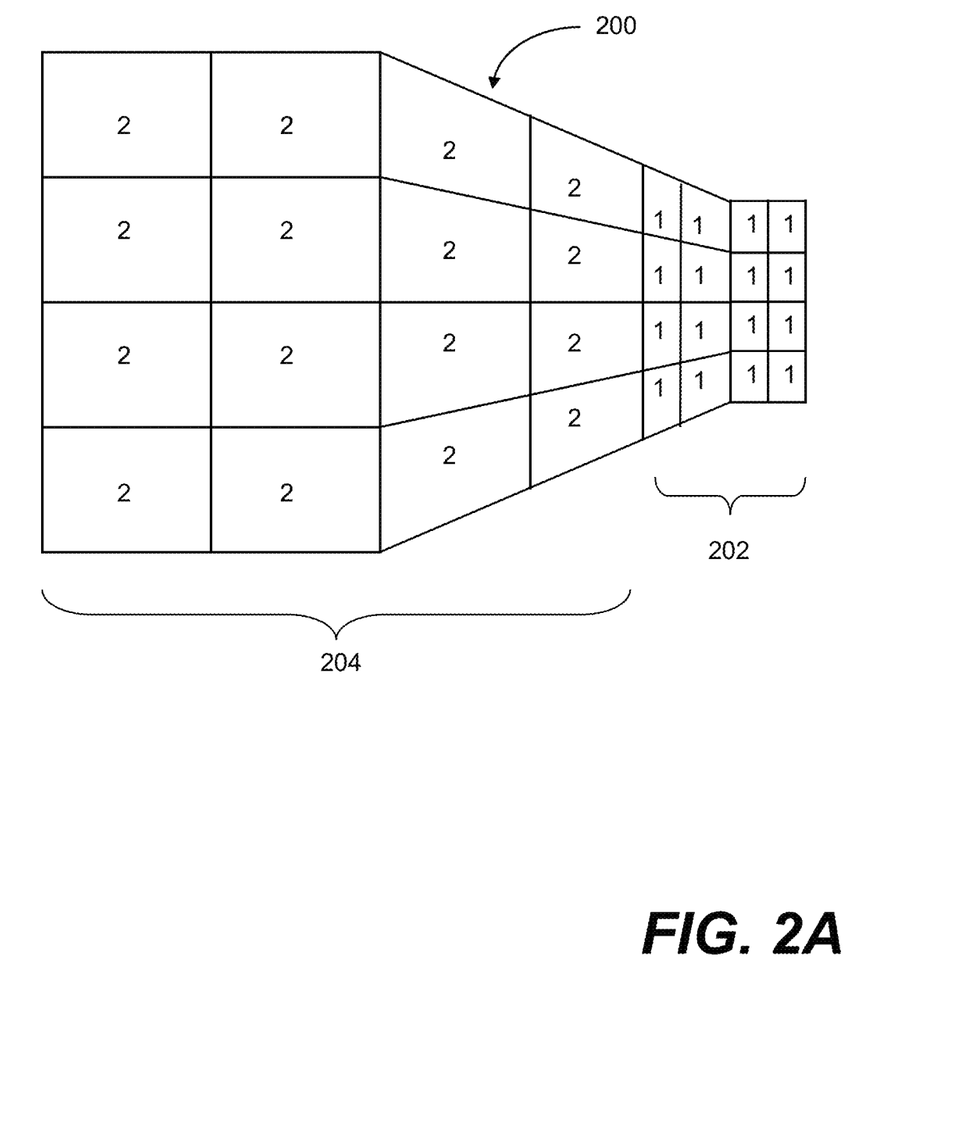
FIGS. 2A-2C are two-dimensional diagrams graphically showing an exemplary procedure for establishing respective critical time step sizes of finite elements of a FEA model in accordance with one embodiment of the present invention.
Figure 2B:
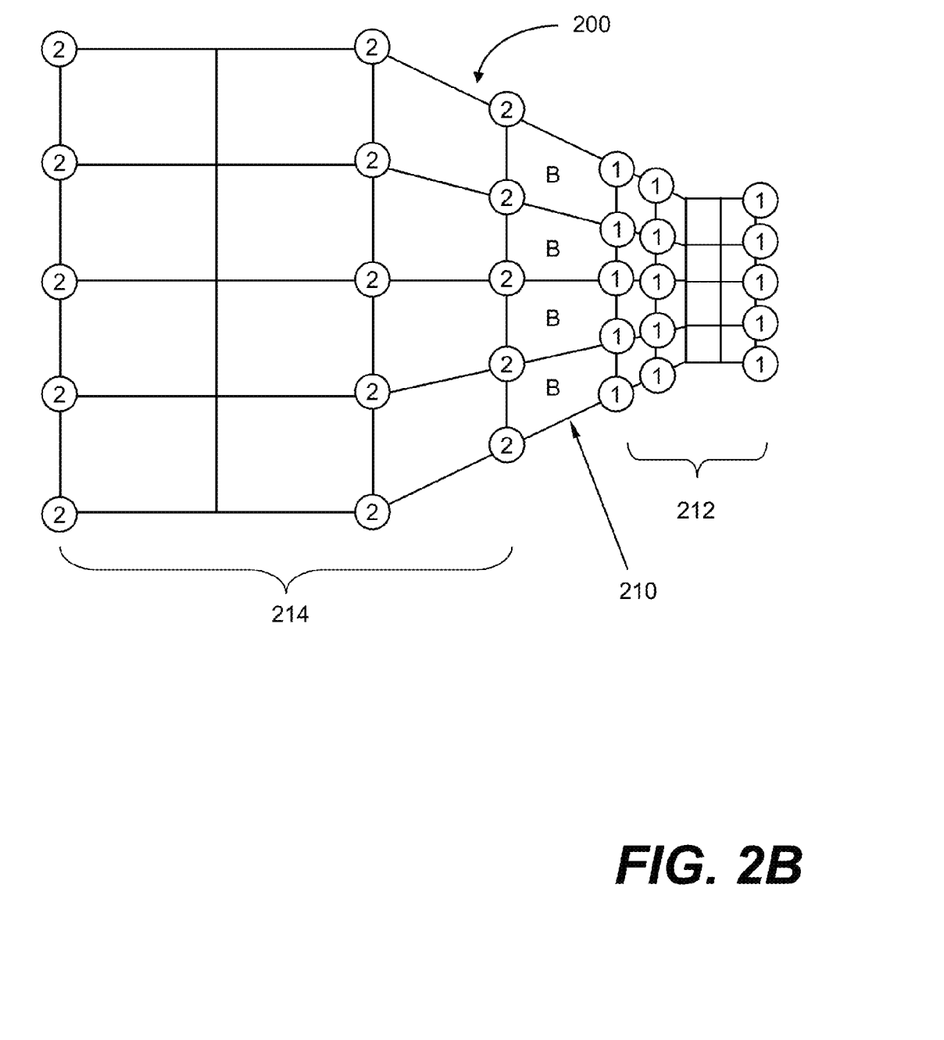
Figure 2C:
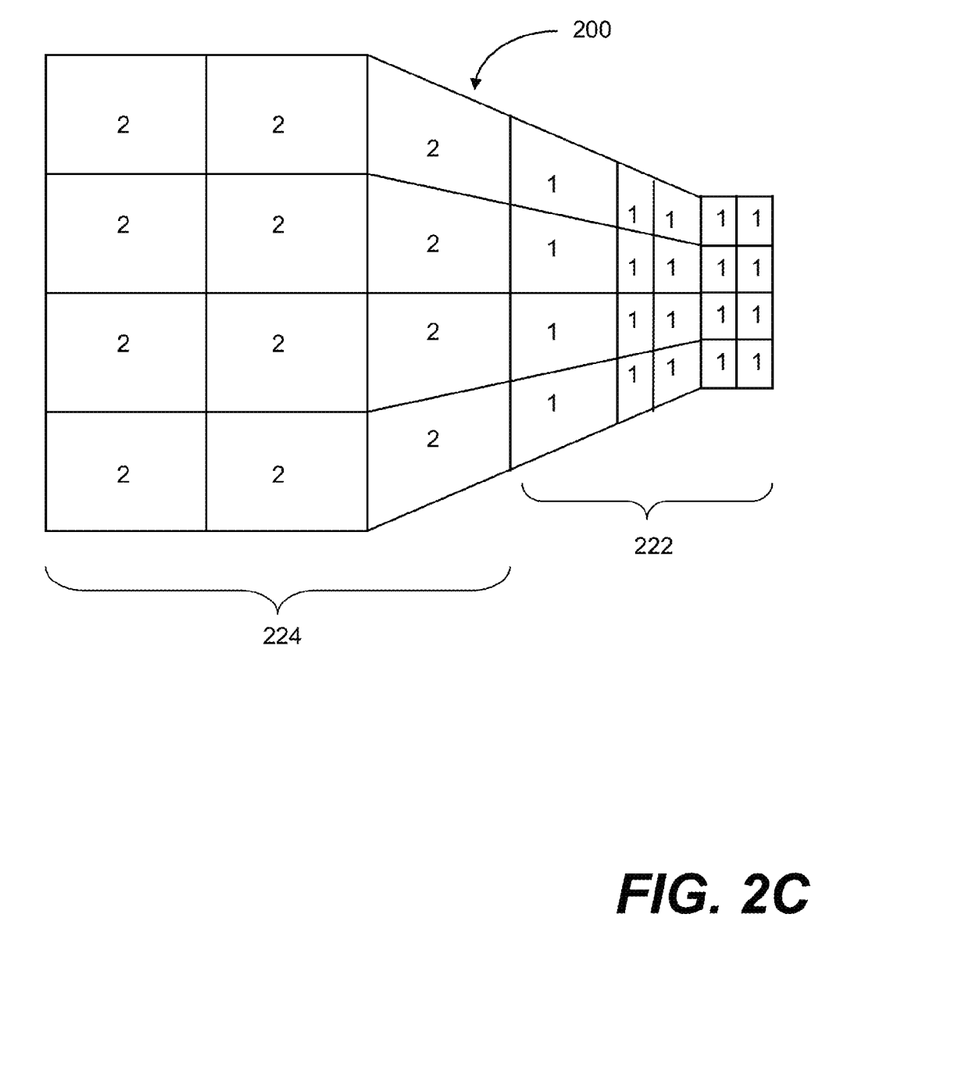

To demonstrate how to establish each finite element's critical time step size, an exemplary procedure is shown in FIGS. 2B-2C. FEA model 200 contains various sizes of finite elements. First, element time step size of each finite element for maintaining a stable solution in explicit FEA is calculated using Eq. 4. Shown in FIG. 2A, smaller finite elements 202 that require a smaller element time step size are denoted by "1", while larger finite elements 204 are denoted by "2". Then, nodal critical time step size of each node is determined by assigning the smallest element time step size of all elements it connects to. FIG. 2B shows nodal critical time step of the FEA model 200 as circles at respective nodes with "1"s 212 and "2"s 214. Attention is directed to finite elements denoted with "B" 210, which are finite elements around the boundary of two different sizes (i.e., two different critical time step sizes). The "B" or boundary finite elements 210 contain nodes having different nodal critical time step sizes. When applying subcycling technique, these boundary finite elements 210 need to be processed at the smaller time step size. Element group "1" 222 and element group "2" 224 shown in FIG. 2C are the result of applying subcycling technique on the FEA model 200.

In this example, finite elements in element group "1" 222 is sorted into the first element group, while finite elements in group "2" 224 into the second element group (i.e., N=2). The first element group will be processed or solved using $\Delta t_{min}$ and the element second group using ($2\Delta t_{min}$).

After the finite elements have been sorted into N element groups, process 100 checks whether mass scaling is required for any finite element in the first element group. Proper amount of mass scaling is applied to those finite elements in the first element group deemed to be too small to maintain a stable solution. For example, when an element's critical time step size ($\Delta t_{cr}$) is smaller than the required minimum time step ($\Delta t_{min}$), the proper amount of mass density increase can be calculated using the difference of ($\Delta t_{min} - \Delta t_{cr}$) and Eq. 6 below. It is noted that mass scaling is applied to the first element group only.

Next at step 110, a time-marching simulation of the product represented by the FEA model is conducted using explicit FEA in conjunction with a combined technique of subcycling and mass scaling. The time-marching simulation contains a plurality of major solution cycles and a plurality of sub solution cycles within each major solution cycle. And each major solution cycle contains one or more sub solution cycles. The major solution cycle is associated with ($2^{N-1}\Delta t_{min}$), while sub solution cycles are associated with smaller multiples of $\Delta t_{min}$. Simulated structural responses are obtained at these solution cycles.

At the end of a predetermined time interval (e.g., each solution cycle, one major solution cycle), process 100 first applies mass scaling to those finite elements designated to be exempted from periodic resorting to ensure a stable solution can be maintained in the originally assigned groups. Then, process 100 resorts all finite elements based on their respective new critical time step sizes at step 112.

In the first element group, proper amount of mass scaling is applied to those finite element have become too small to maintain a stable solution. The mass density of any element deemed to be too small is increased artificially to ensure the element critical time step size is at least equal to $\Delta t_{min}$.

Finally, process 100 ends when a termination condition has reached at decision 114, for example, the simulation time has exceeded a predefined total simulation time (e.g., user specified total simulation time). Otherwise, process 100 moves back to step 110 to repeat until decision 114 becomes true ("yes").

Figure 3A:
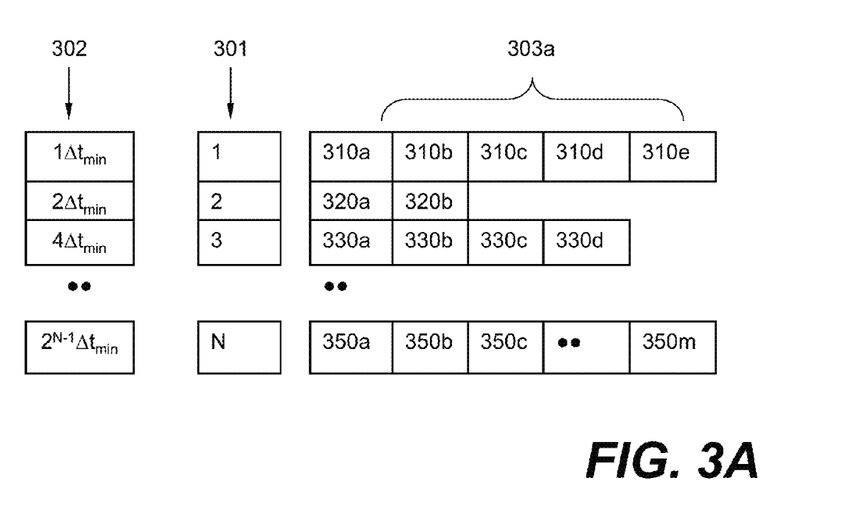
FIGS. 3A-3B are diagrams showing exemplary element groups and respective required minimum time step sizes in accordance with one embodiment of the present invention.
Figure 3B:
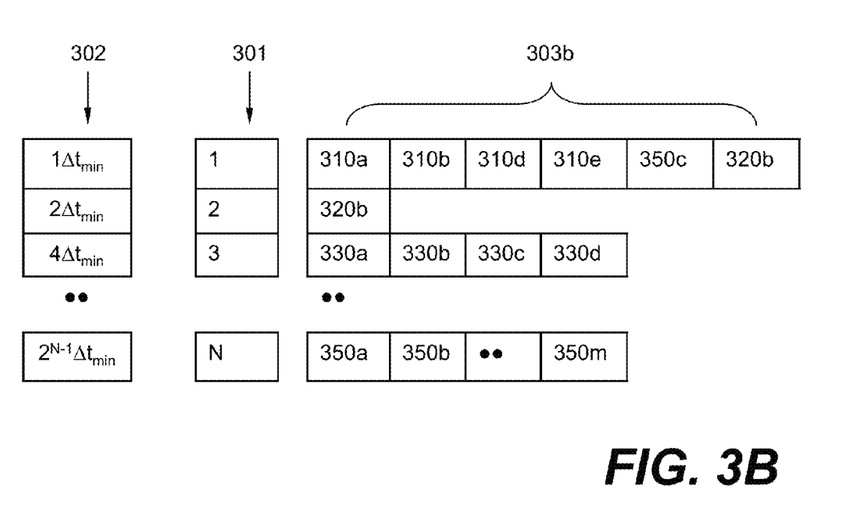

In a more general representation of sorting finite elements into various different element groups, FIG. 3A shows a data structure used for element group management in accordance with one embodiment of the present invention. Sorting of finite elements 303a results into N element groups 301, where N is a whole number or integer greater than one. Each element group 301 contains a list of finite elements 303a. For example, the first group includes finite elements 310a-e, the second group contains elements 320a-b, the third group contains elements 330a-d, and the N-th group contains elements 350a-m. Minimum required time step sizes 302 for respective element groups 301 are integer multiples of one another. According to one embodiment, the first group requires minimum time step size $\Delta t_{min}$, the second element group requires $2\Delta t_{min}$, the third element group requires $4\Delta t_{min}$, and the N-th element group requires $2^{N-1}\Delta t_{min}$.

Finite elements are periodically resorted during a time-marching simulation, when using the combined technique of subcycling and mass scaling. The finite elements 303b can be associated with different element groups 301 after resorting shown in FIG. 3B.

A number of different types of finite elements can be used for the FEA model, for example, 4-node quadrilateral shell element 401 and 8-node solid element 402 shown in FIG. 4.

Figure 5:
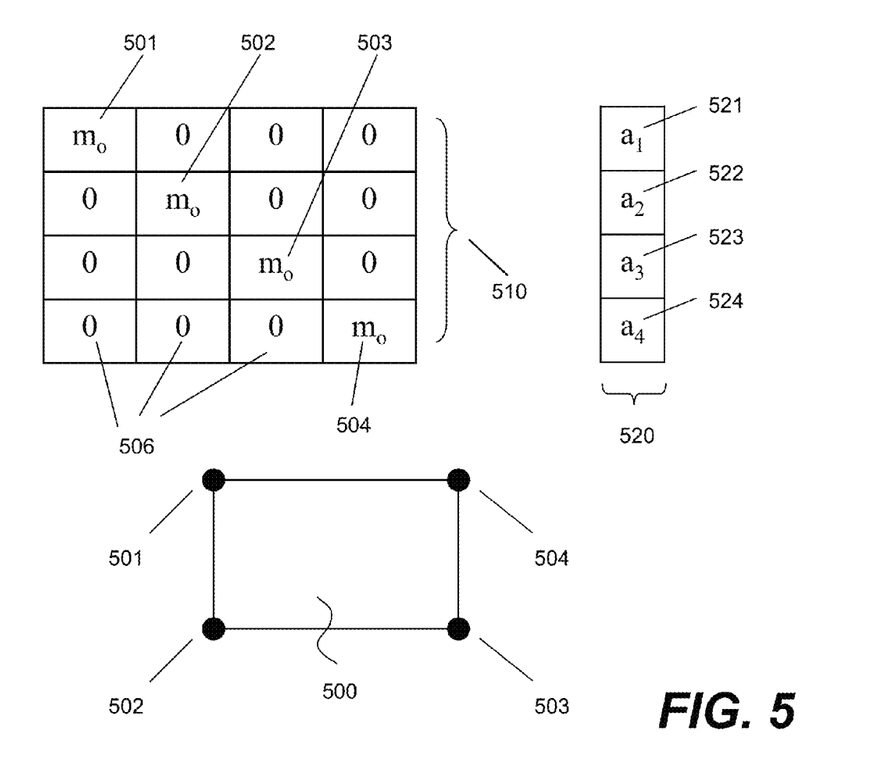
FIG. 5 is a diagram showing an exemplary quadrilateral shell element and corresponding mass matrix and nodal acceleration vector used in explicit finite element analysis, to which mass scaling is applied in accordance with one embodiment of the present invention.

Referring now to FIG. 5, the mass scaling technique is shown. In an explicit finite element analysis, the equation-of-motion of a system (e.g., a structure) is listed as follows:

$$a = M^{-1}(f_{ext} - f_{int}) \tag{Eq. 1}$$

where a is the unknown acceleration vector representing nodal accelerations, M is a lumped, diagonal, matrix with zeros in the off-diagonal terms, and $f_{ext}$ and $f_{int}$ are the external applied forces and the internal nodal forces, respectively. The force term $f_{ext} - f_{int}$ is referred to as the residual forces including, but not limited to, applied loads, contact forces, internal stresses. Because M has only diagonal terms, computation of $M^{-1}$ can simply be performed as a division instead of costly matrix inversion. FIG. 5 shows a diagonal mass matrix 510 and corresponding acceleration vector 520 for an exemplary 4-node shell element 500. In this exemplary mass matrix 510, each of the four nodes has the same amount of mass represented by the diagonal term $m_o$ (e.g., lumped nodal mass 501, 502, 503, or 504). All of the off-diagonal terms 506 are zeros. The acceleration vector 520 includes the acceleration at each of the nodes (i.e., $a_1$ 521, $a_2$ 522, $a_3$ 523, and $a_4$ 524). The inertia force for each of the nodes is calculated with the diagonal terms multiplying the corresponding acceleration as follows:

$$f_i = \sum_{j=1,N} m_{ij} a_j \quad i = 1, N \qquad (Eq. 2)$$

where N is the number of nodes in the element. N is equal to 4 for a quadrilateral shell element and 8 for a hexahedral solid element. The inertia forces at four nodes of the element 500 are calculated in accordance with Eq. 2 as follows:

$f_1 = m_o a_1 + (0)a_2 + (0)a_3 + (0)a_4 = m_o a_1$ $f_2 = (0)a_1 + m_o a_2 + (0)a_3 + (0)a_4 = m_o a_2$ $f_3 = (0)a_1 + (0)a_2 + m_o a_3 + (0)a_4 = m_o a_3$ $f_4 = (0)a_1 + (0)a_2 + (0)a_3 + m_o a_4 = m_o a_4 \qquad$ (Eq. 3)

In order to simplify the illustration and description, only one component at each node is shown in FIG. 5. In a Cartesian coordinate system, there are three translational masses at each node, hence total number of components is 12 (i.e., three times four).

Eq. 1 is solved with an explicit method in time integration, which is performed with one time step at a time. The explicit method can only produce stable solution only if the time step size Δt is smaller than the critical value Δt (i.e., critical time step size), which is determined by the following formula:

$$\Delta t_{cr} = \frac{2}{\omega_{max}} \qquad (Eq. 4)$$

$\omega_{max}$ is the maximum eigenfrequency of the system. The eigenfrequencies can be obtained by solving the following eigenvalue problem:

$det[K - \omega_i^2 M] = 0 \qquad$ (Eq. 5)

where K and M are m×m stiffness and mass matrix of the system, respectively, and m is number of degrees of freedom of the system. The maximum eigenfrequency $\omega_{max}$ is generally a large number (e.g., in the order of $10^6$ Hz), thus the critical time step size $\Delta t_{cr}$ is a very small number (e.g., in the order of microseconds). This small time step limits the usefulness of the explicit method in simulating a quasi-static process such as metal forming One way to increase the critical time step size is to decrease the maximum eigenfrequency $\omega_{max}$, which can be achieved by increasing the mass of the system. The present invention allows a user to specify a desired time step size Δt. The required mass to ensure stability of the explicit method can then be calculated as follows:

$m = \alpha k (\Delta t)^2 \qquad$ (Eq. 6)

where m is the required mass, k is the stiffness and α is a constant that depends on the specific integration scheme. In a finite element analysis model, each of the elements has a stiffness that depends on the geometry and material properties. Hence, the required mass may be computed using Eq. 6 for each of the elements at each solution cycle. The critical time step size is a function of the square root of the mass, thus a much larger mass is required to increase the critical time step. The required mass is also referred to as the added mass hereinafter, and mass scaling is referred to the procedure to modify the real mass of a system with the added mass.

Mass scaling can be applied with a number of techniques. One of the most basic approaches is to change material mass density of the entire structure in a trial-and-error manner. Such procedure can generally be performed by users of the FEA without any automated computation, and the FEA solution could be obtained with a suitable material mass density after several material mass density adjustments.

Automated procedure is implemented in an application module (e.g., FEA software). Generally, a desired time step size is specified by the user of the FEA, the application module comprises certain logics or subprograms that would calculate a factor to increase the mass density automatically such that the desired time step size can be used in the engineering simulation to obtain a solution. The automated procedure can be carried out in an element-by-element basis. For each element in a FEA model, a critical time step size can be calculated based on element's mass and geometry. Based on Eq. 4, the critical time step size $\Delta t_{cr}$ can be increased by decreasing the maximum eigenfrequency, which is equivalent to increasing the mass of an otherwise unaltered element.

If a particular element's critical time step size is smaller than the desired time step size, an added mass can be calculated and added to the particular element to ensure the critical time step size of that element would become at least as large as the desired time step size. Some elements may not require any added mass when the critical time step size of those elements is larger or equal to the desired time step size, which can be specified by user (e.g., a parameter in the input file).

Figure 6:
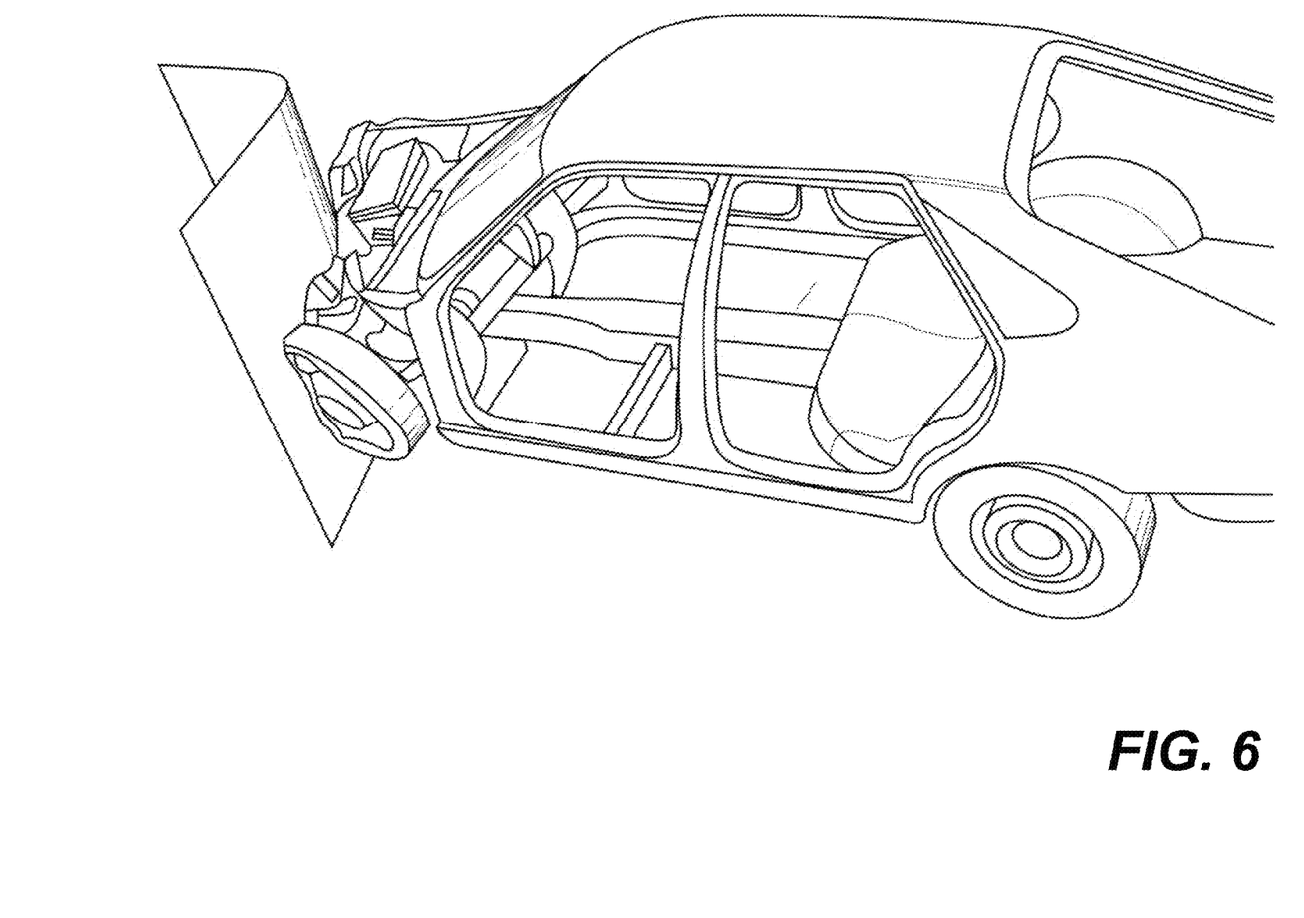
FIG. 6 is a diagram showing an exemplary time-marching simulation result of a car crash using explicit finite element analysis, according to one embodiment of the present invention.
Figure 7:
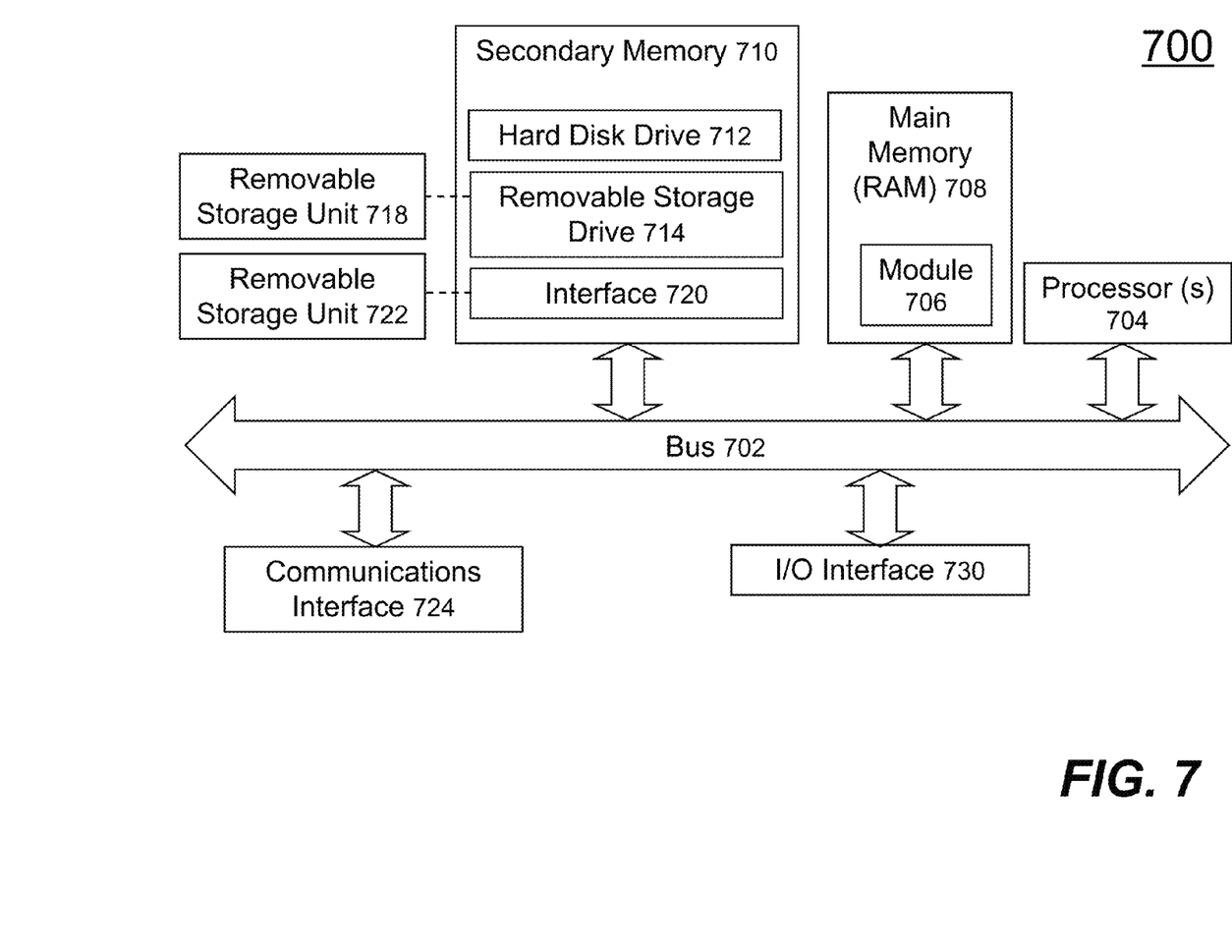
FIG. 7 is a function diagram showing salient components of an exemplary computer, in which an embodiment of the present invention is implemented.

Referring now to FIG. 6, which is a diagram showing an exemplary time-marching simulation result of a car crash using explicit finite element analysis. In other words, a graphical display of numerical simulation results from a finite element analysis of a numerically simulated impact event. There are two structures included in the simulation: an automobile and a barrier. Both of the structures can be represented in a finite element analysis model. The automobile can be modeled with more than 1,000,000 finite elements (e.g., shell, solid and beam elements) with comparable number of nodes. According to one aspect of the present invention, the explicit finite element analysis is enhanced with a combined technique of subcycling and mass scaling According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium" and "computer usable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the finite element analysis is reported to the user via the I/O interface 730 either in a text or in a graphical representation.

In one embodiment, an application module 706 is configured to facilitate the creation of a finite element analysis model representing a product. The application module 706 further allows a combined technique of subcycling and mass scaling to be used in conjunction with explicit finite element analysis. In another embodiment, the application module 706 is configured to facilitate mass scaling to certain finite elements for maintaining stable solution.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas quadrilateral shell finite elements have been shown and described as to how the combined technique of subcycling and mass scaling is accomplished, other types of finite element can be used instead, for example, 8-node hexahedral element, 4-node tetrahedral element, 3-node triangular element, etc. Further, whereas a simple FEA model 200 have two element groups has been shown and described to show the sorting scheme, other more complicated FEA models (more than two element groups) may be used for achieving the same. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of numerically simulating structural behaviors of a product using explicit finite element analysis (FEA) with a combined technique of subcycling and mass scaling, said method comprising:

receiving a FEA model and a minimum time step size ($\Delta t_{min}$) in a computer system having an explicit FEA application module installed thereon, said FEA model representing a product defined by a plurality of nodes and a plurality of finite elements with associated material properties and said minimum time step size being the smallest time step size to be used in a time-marching simulation of the product for ensuring the time-marching simulation to be conducted with an overnight computation;

establishing N element groups with a first element group associated with said minimum time step size, remaining of the N element groups being associated with integer multiples of said minimum time step size, where N is a whole number greater than one;

sorting the finite elements into the N element groups based on respective critical time step sizes of the finite elements;

applying mass scaling to maintain a stable solution in the first element group, said mass scaling being applied to each finite element in the first element group having its element critical time step size smaller than the minimum time step size, such that said each finite element is stably processed in the time-marching simulation; and obtaining simulated structural behaviors at a number of major solution cycles and at one or more sub solution cycles within each major solution cycle by conducting the time-marching simulation using the FEA model with the explicit FEA application module executed in the computer system, said explicit FEA application module applying a combined technique of subcycling and mass scaling with periodic resorting of the finite elements based on their new respective element critical time step sizes and with applying mass scaling to maintain a stable solution in the first element group.

2. The method of claim 1, further comprises designating one or more of the finite elements to be exempted from said periodic resorting.

3. The method of claim 2, further comprises applying mass scaling whenever necessary to said one or more of the finite elements designated to be exempted from said periodic resorting before said periodic resorting at said each major solution cycle.

4. The method of claim 1, wherein said integer multiples of said minimum time step size are based on formula $\Delta t_i = 2^{i-1} \Delta t_{min}$, where i=1, 2, ..., N.

5. The method of claim 1, further comprises calculating the element time step size for each finite element based on said each finite element's properties; and establishing a nodal critical time step size for each node as the smallest one of respective element time step sizes of all finite elements connected to said each node.

6. The method of claim 1, wherein the combination technique further includes synchronizing the simulated structural behaviors obtained at end of said each major solution cycle for said finite elements requiring solutions at said sub solution cycles.

7. The method of claim 1, further comprises ending said time-marching simulation when a predetermined termination condition has reached.

8. The method of claim 7, wherein the predetermined termination condition comprises a user specified total simulation time.

9. A non-transitory machine-readable storage medium containing instructions, when executed in a computer system, for numerically simulating structural behaviors of a product using explicit finite element analysis (FEA) with a combined technique of subcycling and mass scaling by a method comprising:

receiving a FEA model and a minimum time step size ($\Delta t_{min}$) in a computer system having an explicit FEA application module installed thereon, said FEA model representing a product defined by a plurality of nodes and a plurality of finite elements with associated material properties and said minimum time step size being the smallest time step size to be used in a time-marching simulation of the product for ensuring the time-marching simulation to be conducted with an overnight computation;

establishing N element groups with a first element group associated with said minimum time step size, remaining of the N element groups being associated with integer multiples of said minimum time step size, where N is a whole number greater than one;

sorting the finite elements into the N element groups based on respective critical time step sizes of the finite elements;

applying mass scaling to maintain a stable solution in the first element group, said mass scaling being applied to each finite element in the first element group having its element critical time step size smaller than the minimum time step size, such that said each finite element is stably processed in the time-marching simulation; and obtaining simulated structural behaviors at a number of major solution cycles and at one or more sub solution cycles within each major solution cycle by conducting the time-marching simulation using the FEA model with the explicit FEA application module executed in the computer system, said explicit FEA application module applying a combined technique of subcycling and mass scaling with periodic resorting the finite elements based on their new respective element critical time step sizes and with applying of mass scaling to maintain a stable solution in the first element group.

10. The non-transitory machine-readable storage medium of claim 9, further comprises designating one or more of the finite elements to be exempted from said periodic resorting.

11. The non-transitory machine-readable storage medium of claim 10, further comprises applying mass scaling whenever necessary to said one or more of the finite elements designated to be exempted from said periodic resorting before said periodic resorting at said each major solution cycle.

12. The non-transitory machine-readable storage medium of claim 9, wherein said integer multiples of said minimum time step size are based on formula $\Delta t_i = 2^{i-1} \Delta t_{min}$, where i=1, 2, ..., N.

13. The non-transitory machine-readable storage medium of claim 9, further comprises calculating the element time step size for each finite element based on said each finite element's properties; and establishing a nodal critical time step size for each node as the smallest one of respective element time step sizes of all finite elements connected to said each node.

14. The non-transitory machine-readable storage medium of claim 9, wherein the combination technique further includes synchronizing the simulated structural behaviors obtained at end of said each major solution cycle for said finite elements requiring solutions at said sub solution cycles.

15. A system for numerically simulating structural behaviors of a product using explicit finite element analysis (FEA) with a combined technique of subcycling and mass scaling, said system comprising:

a main memory for storing computer readable code for an explicit finite element analysis (FEA) application module;

at least one processor coupled to the main memory, said at least one processor executing the computer readable code in the main memory to cause the explicit FEA application module to perform operations by a method of:

receiving a FEA model and a minimum time step size ($\Delta t_{min}$), said FEA model representing a product defined by a plurality of nodes and a plurality of finite elements with associated material properties and said minimum time step size being the smallest time step size to be used in a time-marching simulation of the product for ensuring the time-marching simulation to be conducted with an overnight computation;

establishing N element groups with a first element group associated with said minimum time step size, remaining of the N element groups being associated with integer multiples of said minimum time step size, where N is a whole number greater than one;

sorting the finite elements into the N element groups based on respective critical time step sizes of the finite elements;

applying mass scaling to maintain a stable solution in the first element group, said mass scaling being applied to each finite element in the first element group having its element critical time step size smaller than the minimum time step size, such that said each finite element is stably processed in the time-marching simulation; and obtaining simulated structural behaviors at a number of major solution cycles and at one or more sub solution cycles within each major solution cycle by conducting the time-marching simulation using the FEA model with the explicit FEA application module executed in the system, said explicit FEA application module applying a combined technique of subcycling and mass scaling with periodic resorting the finite elements based on their new respective element critical time step sizes and with applying of mass scaling to maintain a stable solution in the first element group.

16. The system of claim 15, further comprises designating one or more of the finite elements to be exempted from said periodic resorting.

17. The system of claim 16, further comprises applying mass scaling whenever necessary to said one or more of the finite elements designated to be exempted from said periodic resorting before said periodic resorting at said each major solution cycle.

18. The system of claim 15, wherein said integer multiples of said minimum time step size are based on formula $\Delta t_i = 2^{i-1} \Delta t_{min}$, where i=1, 2, ..., N.

19. The system of claim 15, further comprises calculating the element time step size for each finite element based on said each finite element's properties; and establishing a nodal critical time step size for each node as the smallest one of respective element time step sizes of all finite elements connected to said each node.

20. The system of claim 15, wherein the combination technique further includes synchronizing the simulated structural behaviors obtained at end of said each major solution cycle for said finite elements requiring solutions at said sub solution cycles.

* * * * *